United States Patent
Allo

(10) Patent No.: US 11,449,643 B2
(45) Date of Patent: Sep. 20, 2022

(54) DISTRIBUTED DATA STORAGE SYSTEM WITH OFFLINE OPTIMIZATION

(71) Applicant: Seagate Technology LLC, Cupertino, CA (US)

(72) Inventor: Christopher Nicholas Allo, Lyons, CO (US)

(73) Assignee: Seagate Technology LLC

( * ) Notice: Subject to any disclaimer, the term of this patent is extended or adjusted under 35 U.S.C. 154(b) by 387 days.

(21) Appl. No.: 16/801,861

(22) Filed: Feb. 26, 2020

(65) Prior Publication Data
US 2021/0264062 A1    Aug. 26, 2021

(51) Int. Cl.
```
G06F 21/78      (2013.01)
G06F 21/60      (2013.01)
G06F 21/33      (2013.01)
G06F 8/61       (2018.01)
G06F 3/06       (2006.01)
G06F 21/57      (2013.01)
```

(52) U.S. Cl.
CPC .............. *G06F 21/78* (2013.01); *G06F 3/067* (2013.01); *G06F 3/0622* (2013.01); *G06F 3/0653* (2013.01); *G06F 3/0658* (2013.01); *G06F 3/0683* (2013.01); *G06F 8/61* (2013.01); *G06F 21/33* (2013.01); *G06F 21/577* (2013.01); *G06F 21/602* (2013.01)

(58) Field of Classification Search
CPC ........... G06F 3/062–0623; G06F 21/44; G06F 21/50; G06F 21/51; G06F 21/54; G06F 21/57; G06F 21/577; G06F 21/70; G06F 21/78–79
See application file for complete search history.

(56) References Cited

U.S. PATENT DOCUMENTS

| | | |
|---|---|---|
| 2009/0199288 A1 | 8/2009 | Buch et al. |
| 2014/0020083 A1* | 1/2014 | Fetik ................... G06F 21/78 726/11 |
| 2018/0183855 A1 | 6/2018 | Sabella et al. |
| 2018/0365635 A1 | 12/2018 | Lucrecio et al. |
| 2018/0367314 A1 | 12/2018 | Egner et al. |
| 2020/0120136 A1* | 4/2020 | Gadhe ................... H04L 63/20 |

OTHER PUBLICATIONS

B. Dolgunov, "Enabling Optimal Security for Removable Storage Devices," Fourth International IEEE Security in Storage Workshop, 2007, pp. 15-21, doi: 10.1109/SISW.2007.6. (Year: 2007).*

* cited by examiner

*Primary Examiner* — Khoa D Doan
(74) *Attorney, Agent, or Firm* — Hall Estill Law Firm

(57) ABSTRACT

A distributed data storage system can connect a customization module to at least one host and a second data storage device via a network controller. The customization module may disconnect the first data storage device from the host and second data storage device prior to assessing a security operation of the first data storage device with the customization module, generating an optimization strategy with the customization module based on the assessed security operation, implementing the optimization strategy in the first data storage device to alter at least one security parameter of the first data storage device, and then connecting the first data storage device to the host and second data storage device to allow at least one data access to be executed to the first data storage device with the altered at least one security parameter.

20 Claims, 3 Drawing Sheets

DISTRIBUTED DATA STORAGE SYSTEM WITH OFFLINE OPTIMIZATION

SUMMARY

A distributed data storage system, in accordance with some embodiments, has a customization module connected to at least one host and a second data storage device via a network controller. The customization module disconnects the first data storage device from the host and second data storage device prior to assessing a security operation of the first data storage device with the customization module, generating an optimization strategy with the customization module based on the assessed security operation, implementing the optimization strategy in the first data storage device to alter at least one security parameter of the first data storage device, and then connecting the first data storage device to the host and second data storage device to allow at least one data access to be executed to the first data storage device with the altered at least one security parameter.

Other embodiments of a distributed data storage system connects customization module to at least one host and a second data storage device via a network controller. The customization module disconnects the first data storage device from the host and second data storage device prior to assessing a data access operation of the first data storage device with the customization module, generating an optimization strategy with the customization module based on the assessed data access operation, implementing the optimization strategy in the first data storage device to alter at least one data access parameter of the first data storage device, and then connecting the first data storage device to the host and second data storage device to allow at least one data access to be executed to the first data storage device with the altered at least one data access parameter.

In various embodiments, a first data storage device is connected to a second data storage device and a host as part of a distributed data storage system. A customization module is connected to the first data storage device and configured to disconnect the first data storage device from the host and second data storage device prior to assessing a security operation of the first data storage device with the customization module, generating an optimization strategy with the customization module based on the assessed security operation, implementing the optimization strategy in the first data storage device to alter at least one security parameter of the first data storage device, and connecting the first data storage device to the host and second data storage device in order to execute at least one data access to the first data storage device with the altered at least one security parameter.

These and other features which may characterize various embodiments can be understood in view of the following detailed discussion and the accompanying drawings.

DETAILED DESCRIPTION

Various embodiments of a data storage system disclosed herein are generally directed to optimizing data storage device operation and security at the edge of the data storage system.

The proliferation of data generation with mobile computing devices has emphasized the ability of computing systems to provide relatively large volumes of data storage that provide fast and reliable data access. In response, distributed data storage systems were developed that utilize multiple data storage devices to provide greater data capacity and faster data access than a single data storage device alone. While the utilization of multiple data storage devices has been scaled to provide even large volumes of data storage, the number of data storage devices being employed has created operational complexity, initialization delays, and security risks that jeopardize the performance of data accesses and integrity of data and system components.

Accordingly, a distributed data storage system employing multiple data storage devices can utilize one or more customization modules that can optimize the operation and security of a data storage device without the device being connected to a network. The ability to optimize a data storage device while the device is offline allows the data storage device to be physically smaller and logically slower than a device having internal optimization capabilities. The external nature of a customization module from a data storage device allows the module to be a physical key that ensures authentic security updates without concern for unwanted main and side channel attacks.

Figure 1:
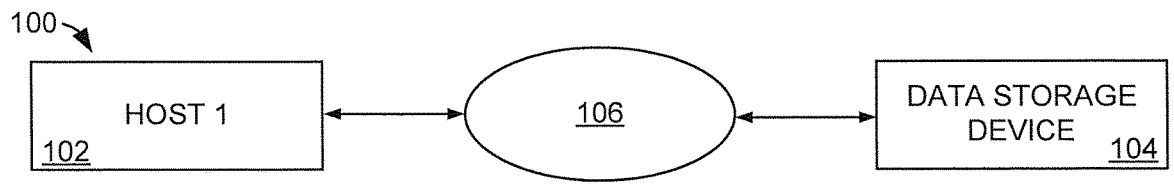
FIG. 1 provides a functional block representation of an example distributed data storage system in which various embodiments can be practiced.

FIG. 1 depicts a functional block representation of an example distributed data storage system 100 in which assorted embodiments may be practiced. Any number of hosts 102 can be connected to a plurality of data storage devices 104 via one or more wired and/or wireless data pathways that can be characterized as a network 106. It is contemplated that the various hosts 102 can be different computing components located in a single physical location or multiple different physical locations. Similarly, the data storage devices 104 may be matching, or dissimilar, types of data storage with any variety of data storage mechanisms, storage capacity, access speed, and physical size.

Figure 2:
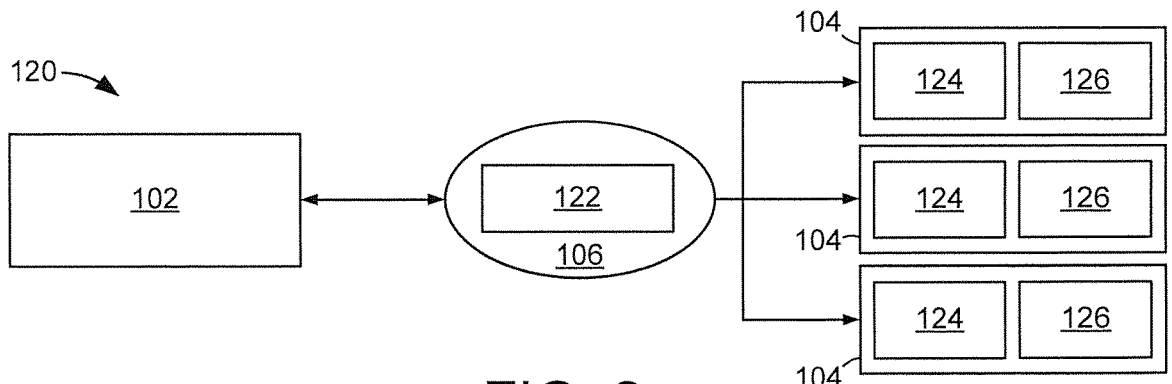
FIG. 2 depicts a block representation of aspects of an example distributed data storage system utilized in accordance with some embodiments.

The interconnection of the assorted hosts 102 and data storage devices 104 via the network 106 allows for efficient remote data storage and retrieval that can be scaled to provide greater, and more diverse, data storage capabilities. FIG. 2 depicts a functional block representation of a portion of an example distributed data storage system 120 that provides scaled data storage in accordance with some embodiments. A network controller 122 can be physically positioned anywhere in the network 106, such as in a server, router, switch, or node, and direct data access operations between hosts 102 and one or more data storage devices 104. It is contemplated that the network controller 122 operates in conjunction with local controllers 124 of the respective data storage devices 104 to store host-generated data to local memories 126 and subsequently retrieve such data upon request.

The network controller 122 can choreograph a variety of system 120 activities that are directed at providing reliable and authentic data access for a host 102. For instance, the network controller 122 can distribute data to multiple data storage devices 104, such as in a redundant array of independent disks (RAID) configuration, can generate data information, such as parity and/or error correction codes, can perform data maintenance, such as garbage collection and data mapping, and can attest the data storage devices 104 and data being transferred. The use and capabilities of the network controller 122 can be diverse and provide the ability to handle a variety of data storage, data maintenance, data security, and system security operations in one or more data storage devices 104 independently and collectively.

Figure 3:
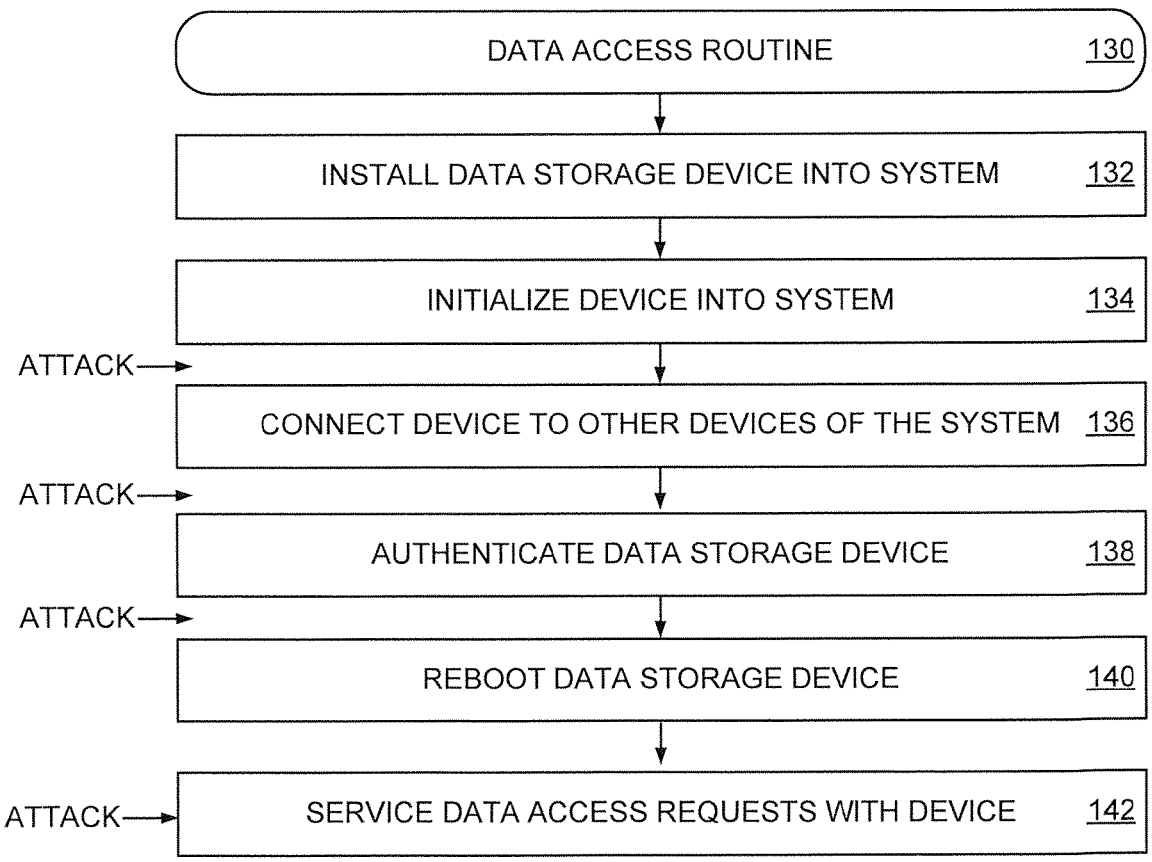
FIG. 3 displays an example data access routine ne that can be practiced in the data storage system of FIGS. 1 & 2 in accordance with assorted embodiments.

FIG. 3 conveys an example data access routine 130 that can be carried out by the data storage systems 100/120 of FIGS. 1 & 2 in accordance with some embodiments. The routine 130 begins with the installation of at least one data storage device in step 132 into a data storage system. Such installation can involve the physical insertion and/or electrical connection of one or more data storage devices to at least one network component, such as a controller of a server, router, switch, or node. It is contemplated that the installation of step 132 involves a data storage device that is not initialized to the data storage system. That is, step 132 can install a data storage device that has the capability of storing data, but has not yet been setup for engagement and utilization by the data storage network, such as for security and/or operational customizations derived from the system.

The installation of a data storage device leads to step 134 electronically initializing the device, such as with one or more boot or startup operations. For example, step 134 can conduct one or more tests to ensure the presence and operation of one or more data storage device components, such as a memory array, bit line, or memory cell. Data storage device initialization in step 134 may involve the execution of one or more software applications that enable the storage, and retrieval, of data by one or more system components. An initialized data storage device can then be connected to other system devices and components via one or more network data pathways in step 136.

While not required, step 138 may proceed to authenticate the newly connected data storage device by conducting one or more authenticating operations, such as a certificate, key, or password swap, that acts as a handshake verification of the data storage device itself and perhaps the data stored therein. It is noted that one or more authenticating operations may be conducted concurrently or sequentially to validate the device as genuine and trustworthy. Once a data storage device has been authenticated in step 138, one or more security customizations can be downloaded from the network and installed on the data storage device. For instance, firmware, security protocol, and network mapping information can be inputted into a data storage device to bring the device into uniformity and compliance with the network and other data storage devices of the system.

The newly downloaded information, settings, software, protocol, and security from step 138 are then utilized with the rebooting of the data storage device in step 140. It is contemplated that the rebooting of step 140 may be a complete device power cycle or the restarting of one or more software applications. Upon the completion of the rebooting, step 142 satisfies one or more data access requests from the system by storing or retrieving data from one or more connected hosts and/or data storage devices.

As illustrated by arrows, the assorted steps of routine 130 can be susceptible to one or more side, or main, channel attacks that monitor at least one operating parameter, such as power, data signals, security credentials, or firmware updates, to gain access to a portion of the distributed data storage system. For instance, a data storage system can be particularly susceptible to attacks when a new data storage device is connected to a network, updated with security information, rebooted to initialize new security protocols, and during device/network authentication. It is noted that the online connection of a newly installed data storage device provides unwanted third-parties with the ability to track and reverse engineer portion of the data storage system, such as firmware and security protocol, that jeopardizes the integrity and reliability of the assorted data storage devices as well as the data stored on those devices.

Figure 4:
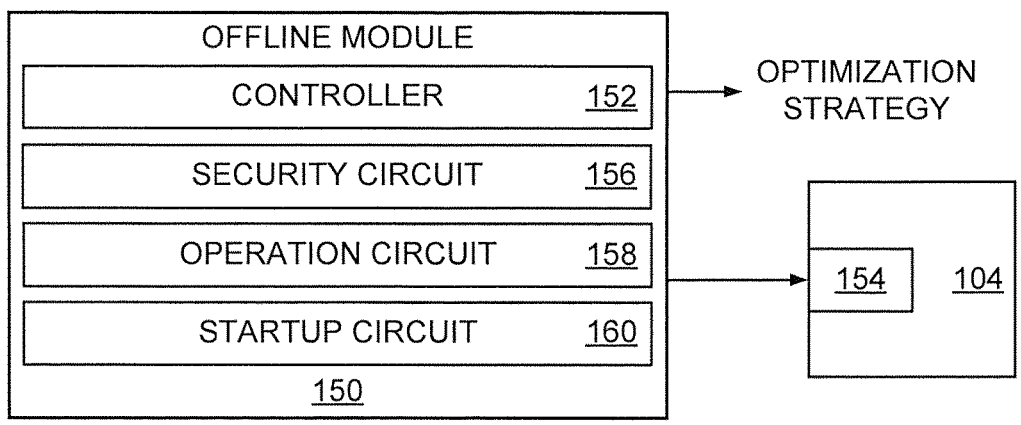
FIG. 4 depicts an example offline module that can be utilized in a distributed data storage system in accordance with some embodiments.

Accordingly, various embodiments are directed to providing offline data storage device customization that allows for security and/or operational operations to be conducted without a network connection, which mitigates the risk and liability of third-party attacks. FIG. 4 depicts a block representation of an example offline module 150 that can be employed by a distributed data storage system in accordance with some embodiments to provide offline data storage device customization. The module 150 may be resident in hardware and/or software as a stand-alone component, such as a circuit board connected to the network, or as a supplement to an existing system component, such as a chip or circuit board of a data storage device, network server, or host.

The module 150 can utilize one or more local controllers 152, such as a microprocessor or other programmable circuitry, to direct the input of at least data storage device manufacturing settings, security protocol, and initialization procedure to develop a customization strategy. In some embodiments, the offline module 150 may be an external circuit board connected to a port 154 of a data storage device 104 to access and configure the device controller 124 with optimized security, boot, and/or operational settings or parameters. It is contemplated, but not required, that the local controller 152 is a commandeered controller/processor 124 of the data storage device 104. Furthermore, the local controller 152 may be an independent circuit that operates in conjunction with a supplemental controller/processor 124.

The offline module 150 can employ a security circuit 156 that generates one or more security customizations based on detected conditions and/or settings of the connected data storage device 104. The security circuit 156 can upgrade, or otherwise change, one or more security policies, procedures, and settings to provide an optimized security setup. While not limiting, such security upgrade/changes can involve conforming the connected data storage device 104 to existing security settings, policies, and procedures of other devices and/or components of the distributed data storage system.

Security customizations with the security circuit 156 may, alternatively, upgrade/change the security settings, policies, and procedures of a data storage device to specifically improve device initialization speed or integrity against third-party attacks. For instance, the security circuit 156 can assess that the connected data storage device has a current, or predicted, susceptibility to a third-party attack, such as relatively easy accessibility for a third-party to monitor, track, and reverse engineer security protocol, settings, policies, or data from power consumption tracking, firmware handshakes, or certificate/key validation. As a result of the customizations provided by the security circuit 156, the data storage device can enjoy uniform security parameters that make initialization and booting in the distributed data storage system more efficient and/or enjoy altered security parameters that are catered to a detected, or predicted, security susceptibility.

The customization and optimization of the security aspects of a data storage device can also be conducted for operational aspects not tied to security. An operation circuit 158 of the offline module 150 can assess the current operational behavior, performance, and/or protocols of a data storage device to generate one or more alterations that customize and optimize the data storage performance of the device. For example, but in no way limiting, an operation circuit 158 can detect, or predict, how the data storage device conducts data access operations, data maintenance, or data overhead operations and subsequently generates one or more alterations to how data is stored, retrieved, mapped, deduped, refreshed, or garbage collected.

The customization of security parameters with the security circuit 156 and of operational parameters with the operation circuit 158 may be complemented by the customization and optimization of startup circuit 160. It is noted that a startup circuit 160 can operate independently of the other circuits 156/158 of the offline module 150, but various embodiments generate data storage device customizations with the assorted circuits 156/158/160 that complement each other. That is, device alterations for security purposes are checked against other operational and startup alterations to ensure each alteration remains effective to optimize the device when the other alterations are carried out. It is contemplated that the actual implementation of device alterations for security, operational, or startup optimization can be concurrent, or staggered, to prevent data storage performance degradation during the implementation of the alterations.

While various data storage device evaluations and alterations may be conducted while the data storage device is online and connected to one or more other hosts/components/devices via a wired and/or wireless network 106, the online connection and device initialization can be wrought with susceptibility for third-party attacks, as shown in FIG. 3. Hence, employing the offline module 150 allows for device evaluation, generation of optimizations, and implementations of the optimizations can be conducted entirely disconnected from other hosts/components/devices, which decreases the risk of third-party attacks and increases the integrity of stored data.

In contrast to an online optimization of a data storage device, the offline module 150 allows for temporary, or permanent, supplementation of the computing capabilities of the connected data storage device 104. That is, the device 104 can have relatively slow processing capabilities that are supplemented by the local controller 152 that carries out one or more device parameter alterations to optimize security, operations, or startup performance. Such externally connected offline module 150 connectivity allows the data storage device 104 to be relatively inexpensive and operationally lean while enjoying customizations that optimize performance without adding susceptibility to third-party attacks, device initialization into a system, or device booting after a power cycle.

The offline module 150, in some embodiments, can be inserted into a data storage device 104 to provide temporary upgrades in security during expected times of security susceptibility or storage of sensitive data. For instance, physical installation of a new data storage device can trigger the offline module 150 to efficiently alter and optimize startup parameters that would tax and delay the device controller 124. In this way, the offline module 150 can serve as an external computing supplement to the data storage device 104 that generates and carries out security, data access operation, and/or startup parameter changes to enhance the capabilities of the device 104 without introducing an opportunity for third-party infiltration of the distributed data storage system.

Figure 5:
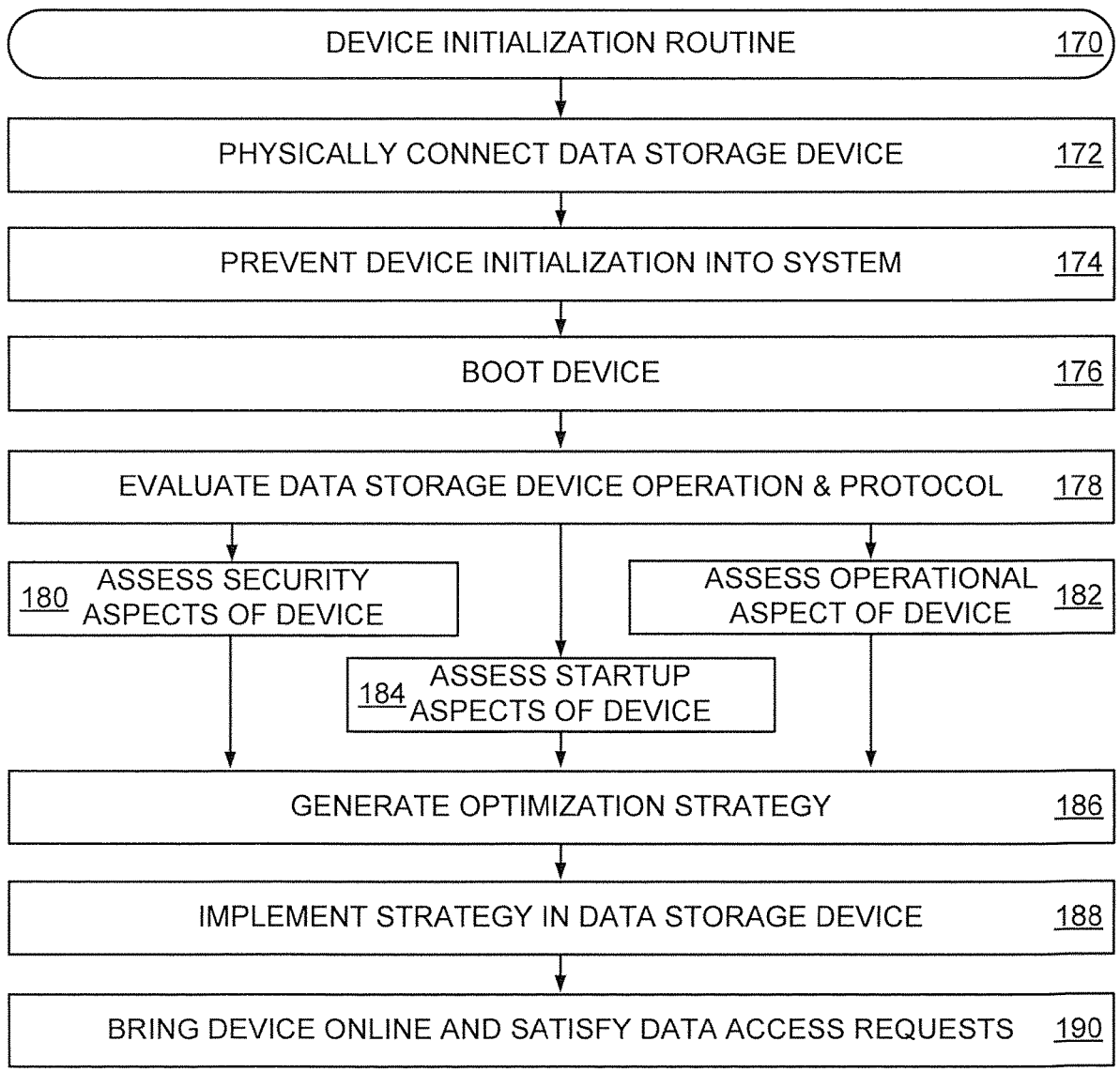
FIG. 5 illustrates an example initialization routine that can be executed in accordance with various embodiments of a distributed data storage system.

FIG. 5 depicts an example device initialization routine 170 that can be conducted offline with the offline module 150 employed in accordance with various embodiments. The physical connection of a new data storage device into a distributed data storage network in step 172 can be conducted with, or without, the distributed data storage network being operational or active through the utilization of a network. If a network is in place, step 174 specifically prevents the newly installed data storage device from connecting to any other component, device, or host of the system via a wired, or wireless, data pathway. It is noted that step 174 can be skipped if the physical installation of the new data storage device does not correspond with electrical connection to other system components, devices, or hosts.

With the data storage device physically installed, but offline from the rest of the distributed data storage system, step 176 boots the data storage device with the firmware and operating system installed by the device manufacturer. It is contemplated that step 176 brings the data storage device completely through a boot process, which can correspond with the data storage device being ready to satisfy data access requests to write, or read, data. Other embodiments of step 176 execute less than all of a boot process for the data storage device so that data access requests could not be serviced, but assorted firmware/software is loaded to the point where security, operational, and startup parameters, settings, and policies can be determined.

Regardless of the amount of a boot process that is carried out, and data accessing capabilities of the device, during step 176, an offline module is utilized in step 178 to evaluate the data storage device. It is noted that the offline module may be electronically activated, physically connected to a device port, or The offline module can conduct one or more tests, polls, and commands on the data storage device to determine at least the default parameters, settings, policies, and protocol set by the device's manufacturer, or by a previously engaged distributed data storage system. While the activity of the offline module can be conducted concurrently, routine 170 sequentially employs the circuitry of the offline module to assess the security aspects of the data storage device in step 180 then assess the operational aspects of the device in step 182 and then assess the startup aspects of the device in step 184. The assessments of steps 180/182/184 can be conducted using any number of detected conditions, such as bit error rate, latency, power consumption, and time-to-ready, and any number of conditions predicted by the offline module, such as susceptibility to third-party attack, future data access request volume, and number of data access requests per power cycle.

The assessed aspects of the data storage device are then utilized in step 186 to generate an optimization strategy that prescribes one or more changes to the default parameters, policies, settings, and/or protocol that exist in the data storage device to optimize security, data access operations, and/or device startup. Step 188 then implements the various changes of the optimization strategy while the data storage device remains offline. It is contemplated that the implementation of changes may involve one or more resets, power cycles, or firmware reboots. The newly implemented optimization changes are then placed into service in step 190 as the data storage device is brought online by establishing one or more data pathways with at least one other system host, component, or other data storage device. It is noted that bringing the device online in step 190 may involve connecting the device to a network controller.

The online status of the data storage device allows one or more data access requests from the distributed data storage system to be received and subsequently satisfied in step 190 by the optimized data storage device. Through the self-installation of the offline module, as conducted by the local module controller 152, the edge computing data storage devices can be customized and optimized without introducing an opportunity for third-party attacks to the device, data, and distributed data system. In a non-limiting example, numerous data storage devices can be sequentially physically installed into a data storage rack, enclosure, or site and maintained in offline status while an external customization card is plugged into each device, which initiates the self-installation of the offline module into each device, the assessment of the capabilities and parameters of each device, and the installation of new settings, policies, protocols, firmware, or software.

Figure 6:
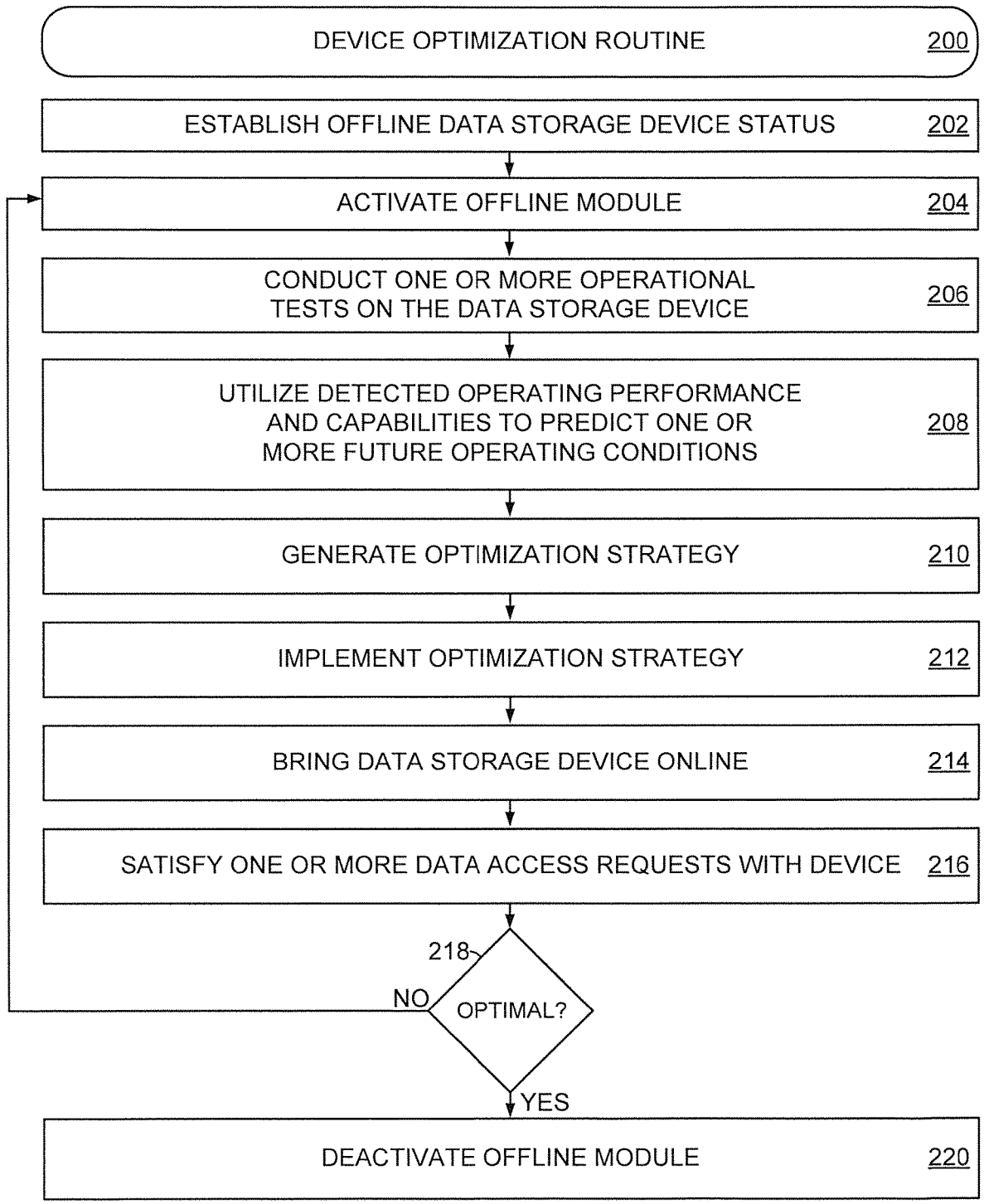
FIG. 6 shows an example device optimization routine that can be executed by a data storage device in accordance with assorted embodiments.

FIG. 6 depicts a timeline of an example device optimization routine 200 that can be carried out in accordance with various embodiments in one or more data storage devices as part of a distributed data storage system. Initially, an offline status is established in step 202. Such offline status may be created by disconnecting a data storage device from any external data pathways or by preventing the device from connecting to other devices/components/hosts upon startup. An offline module is then activated in step 204 by electrically powering the module, physically installing the module into a port of the device, or a combination thereof. The activated offline module maintains the data storage device in an offline mode while executing one or more operational tests in step 206 that determine the operational performance and capabilities of the data storage device. Such operational tests may read, write, map, and/or move data in one more addresses of the device. It is contemplated that the operational test involves existing data stored in the data storage device or offline module-generated test data that is specifically designed to convey the performance and capabilities of the data storage device, such as error rate, access latency, mapping latency, encryption latency, security parameters, and deduplication procedures.

The evaluation of the operating performance and capabilities from step 206 can correspond with current, detected device conditions. It is contemplated that the detected device conditions can be utilized in step 208 to predict one or more future operating conditions with the offline module. That is, circuitry of the offline module can predict behavior, performance, and susceptibility to third-party attacks from current device conditions that are detected with, or without, conducting an operational test while the device is offline. For instance, a predicted condition may be data access latency and/or relatively high error rates if the data storage device experiences a predicted volume of data access requests in a short time span, if a predicted number of data updates are conducted, if a predicted data capacity is reached, or if a predicted number of data reconstructions are executed after data errors/failures.

The ability to determine current and predicted data storage device conditions allows step 210 to generate an optimization strategy that prescribes one or more modifications to the existing data storage device parameters to optimize operational efficiency, reliability, peak performance, and/or average performance. An optimization strategy may prescribe immediate modifications to be implemented before the data storage device is brought online and triggered modifications to be implement after the data storage device is online and a triggering threshold is reached during device operation. For instance, an optimization strategy can prescribe throttling data accesses by inserting operational delays, increasing the size of data access buffers, changing the location of user data, altering the size of garbage collection address ranges, or modifying the generation of metadata upon a data access request once one or more operational thresholds are detected after the data storage device is online and connected at least to one remote host via a network.

In the event there are any immediate, offline modifications to the data storage device settings, policies, protocol, or procedures, step 212 implements those changes before bringing the data storage device online in step 214. It is contemplated, but not required, that step 214 may involve the rebooting of some, or all, of the data storage device to initialize the newly installed operational changes. The online connection of the data storage device in step 214 allows for any number of online connections, handshakes, and verifications to take place with one or more network components, hosts, and other data storage devices. The optimized data storage device is then employed to satisfy one or more data access requests in step 216 to write data to, and/or read data from, memory of the data storage device.

While step 216 may be executed cyclically to service numerous different data access requests from one or more hosts, some embodiments sporadically, continuously, or routinely evaluate the effectiveness of the optimization strategy in decision 218. That is, the offline module can continue operating after the data storage device is brought online to evaluate the operational modifications of the optimization strategy to determine if the previously executed, or pending, modifications are the most effective based on current data storage device operation as part of a distributed data storage system.

If the modifications of the optimization strategy are determined to be sub-optimal and can be improved upon for performance, reliability, or security purposes, routine 200 returns to step 204 where the data storage device is taken offline and the offline module proceeds to generate and subsequently carry out a new optimization strategy. It is contemplated that decision 218 can return to step 210 where a new optimization strategy is generated without taking the device offline or performing any operational tests, which could increase the efficiency of generating the new strategy based on logged operational performance and conditions during step 216. At a scheduled, or spontaneous time after decision 218 determines no new optimization strategy is needed, step 220 can deactivate the offline module, which may correspond with the physical removal of the offline module from the data storage device.

As a non-limiting example of how routine 200 can be carried out in a distributed data storage system, the offline module may be preprogrammed with a static optimization strategy that is executed to alter one or more parameters of the data storage device without conducting an operational test. Such static optimization strategy can be selectively activated by physically inserting an offline module into a data storage device or electrically prompting the implementation of the strategy. Thus, an optimization strategy can be strategically implemented into a data storage device offline without conducting complex online initialization and verification procedures, which greatly reduces the complexity and speed of initializing data storage devices newly installed into a distributed data storage system.

The ability to supplement the computing capabilities of the data storage device with the offline module allows for a newly installed data storage device, with relatively minimal data processing capabilities, to be initialized into a distributed data storage system without connecting to any network components or hosts and without configuring the data storage device with complex operational parameters from the manufacturer. The utilization of the offline module to generate a self-installing optimization strategy without an internet, or other online data pathway, allows for efficient and safe integration of data storage devices into a system without degrading system performance due to overloading the bandwidth of the network or network controller and without introducing opportunities for third-party attacks that can track and reverse engineer aspects of the data storage device, or distributed data storage system, in a manner that compromises, or at least jeopardizes, the integrity of stored data and/or operation of the data storage device.

Through the various embodiments of a distributed data storage system, a data storage device can be evaluated and optimized while offline. By basing optimizations of a data storage device on actual device operating parameters, performance, and capabilities, an offline module can provide customized optimizations without introducing online susceptibilities to third-party attacks. The ability to supplement the computing capabilities of a data storage device with an offline module while offline allows the data storage device to have relatively simple, and cost-efficient, computing components, which is conducive to large-scale distributed data storage systems where numerous data storage devices are employed and frequently swapped in response to device errors and/or failures.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. A method comprising:
    connecting a customization module to distributed data storage system, the distributed data storage system comprising at least one host connected to a first data storage device and a second data storage device via a network controller;
    disconnect the first data storage device from the host and second data storage device;
    assessing a security operation of the first data storage device with the customization module;
    generating an optimization strategy with the customization module based on the assessed security operation;
    implementing the optimization strategy in the first data storage device to alter at least one security parameter of the first data storage device;
    connecting the first data storage device to the host and second data storage device; and
    executing at least one data access to the first data storage device with the altered at least one security parameter.

2. The method of claim 1, wherein the assessed security operation is encryption of data by the first data storage device.

3. The method of claim 1, wherein the assessed security operation is compression of data by the first data storage device.

4. The method of claim 1, wherein the at least one security parameter is an addition of data encryption.

5. The method of claim 1, wherein the at least one security parameter is an addition of a certificate for data access.

6. The method of claim 1, wherein the customization module is resident in a printed circuit board connected to a port of the first data storage device, the printed circuit board being separate and external to the first data storage device when not connected to the port of the first data storage device.

7. The method of claim 6, wherein the customization module supplements security operation of the first data storage device with a controller of the customization module resident on the printed circuit board.

8. The method of claim 6, wherein the at least one security parameter is requiring the physical connection of the printed circuit board to the first data storage device to allow the at least one data access operation.

9. The method of claim 6, wherein the at least one data access operation stores data on the printed circuit board and in memory of the first data storage device.

10. The method of claim 6, wherein the customization module automatically and autonomously installs onto the first data storage device upon physical connection to the port of the first data storage device.

11. A method comprising:
    connecting a customization module to distributed data storage system, the distributed data storage system comprising at least one host connected to a first data storage device and a second data storage device via a network controller;
    disconnect the first data storage device from the host and second data storage device;
    assessing a data access operation of the first data storage device with the customization module;
    generating an optimization strategy with the customization module based on the assessed data access operation;
    implementing the optimization strategy in the first data storage device to alter at least one data access parameter of the first data storage device;
    connecting the first data storage device to the host and second data storage device; and
    executing at least one data access to the first data storage device with the altered at least one data access parameter.

12. The method of claim 11, wherein the at least one data access parameter supplements a controller of the first data storage device with a controller of the customization module to execute the at least one data access.

13. The method of claim 12, wherein the customization module is resident on a printed circuit board connected to a port of the first data storage device, the printed circuit board being separate and external to the first data storage device when not connected to the port of the first data storage device.

14. The method of claim 12, wherein the controller of the customization module has a greater processing capability than the controller of the first data storage device.

15. The method of claim 1, wherein the customization module generates and implements the optimization strategy while the first data storage device has no data connection to the second data storage device or to the host.

16. The method of claim 11, wherein the second data storage device conducts at least one data access from the host while the first data storage device is disconnected from the host and second data device.

17. The method of claim 11, wherein the at least one data access parameter is a data maintenance setting altered in response to a data access performance predicted by the customization module.

18. The method of claim 11, wherein the at least one data access parameter is how data is refreshed when not being accessed by any host external to the first data storage device.

19. An system comprising a first data storage device connected to a second data storage device and a host as part of a distributed data storage system, a customization module connected to the first data storage device and configured to disconnect the first data storage device from the host and second data storage device prior to assessing a security operation of the first data storage device with the customization module, generating an optimization strategy with the customization module based on the assessed security operation, implementing the optimization strategy in the first data storage device to alter at least one security parameter of the first data storage device, and connecting the first data storage device to the host and second data storage device in order to execute at least one data access to the first data storage device with the altered at least one security parameter.

20. The system of claim 19, wherein the customization module resides on a printed circuit board physically connected to a port of the first data storage device.

* * * * *